United States Patent
Chen

(10) Patent No.: US 7,562,596 B2
(45) Date of Patent: Jul. 21, 2009

(54) FIXED TORQUE PRELOAD PIECE

(75) Inventor: Xin-He Chen, Taichung (TW)

(73) Assignee: Hiwin Technologies Corp., Taihung (TW)

( * ) Notice: Subject to any disclaimer, the term of this patent is extended or adjusted under 35 U.S.C. 154(b) by 574 days.

(21) Appl. No.: 11/277,683

(22) Filed: Mar. 28, 2006

(65) Prior Publication Data
US 2007/0227280 A1    Oct. 4, 2007

(51) Int. Cl.
*F16H 29/20* (2006.01)
(52) U.S. Cl. .................................. 74/89.42
(58) Field of Classification Search ............ 74/89.23, 74/89.39, 89.42, 424.71, 424.72; 411/432, 411/433; 403/355, 356
See application file for complete search history.

(56) References Cited
U.S. PATENT DOCUMENTS 3,059,494 A * 10/1962 Grabowski et al. ............ 74/441
3,124,969 A *  3/1964 Grabowski et al. ............ 74/441
3,498,651 A *  3/1970 Peterson ..................... 403/355
4,643,041 A *  2/1987 Benton ........................ 74/441
4,669,324 A *  6/1987 deMey et al. .............. 74/89.23
5,467,661 A * 11/1995 Lange .......................... 74/441
5,501,118 A *  3/1996 Benton ........................ 74/441

* cited by examiner

*Primary Examiner*—Vicky A Johnson
(74) *Attorney, Agent, or Firm*—Banger Shia

(57) ABSTRACT

A fixed torque preload piece is positioned between two nuts of a ball screw, the preload piece is formed with through hole located in an axial direction of the two nuts for receiving at least two steel balls. Two terminal openings of each of the through holes are defined in the surfaces of the preload piece facing the two opposite nuts. Three radial threaded holes are formed in the outer periphery of the preload piece, and the threaded holes are vertical to and in communication with the through holes. An adjusting member, an elastic member and an adjusting screw are received sequentially in the respective threaded holes. The steel balls in the through holes are pushed against the two nuts by the arc-shaped abutting surface of the adjusting member, the pushing of the steel balls can produce an adjustable preload, and can absorb the sudden increase of the pressure effectively, thus obtaining the objective of the present invention of outputting torque stably.

8 Claims, 9 Drawing Sheets

FIXED TORQUE PRELOAD PIECE

BACKGROUND OF THE INVENTION

1. Field of the Invention

The present invention relates to a ball screw, and more particularly to a fixed torque preload piece that is located between two nuts of the ball screw, its design can reduce the rigidity of the preload piece and prevent deformation, and the pushing motion of the steel balls can generate an adjustable preload and can effectively absorb the sudden increase of pressure.

2. Description of the Prior Art

Nowadays, with the advancement of various precision feeding system, various linear motion mechanisms have widely come into human life, manufacturing factory and high science and technology instruments, such as linear guideway, ball screw, and the like. Although the technology for linear mechanism is developing fast, consumers still need the technology to be improved constantly. Therefore, there are still some problems to be solved. And this desire for constant improvement of technology is particular strong in many high precision mechanism-manufacturing fields that require comparative stability and quiet. Hence, the existing linear mechanism still has some technological blind spots to be improved.

In production of a ball screw of a linear product, the thread pitch will be changed because of the manufacturing error or the change in the raw material itself. Such change in thread pith will cause instability when the steel balls are rolling between the nut and the screw shaft, and the preload subjected on the linear product itself will become uneven, causing output fluctuation (decrease in precision of the mechanism) and overly abrasion (preload will go off gradually). Therefore, preload element starts to appear in the ball screw product.

In order to produce a preload between the nuts and to make the two nuts rotate synchronously on the screw shaft, a conventional preload structure has a preload piece arranged between two nuts, and each of the two nuts and the preload piece is milled with a keyslot, then a clamp pad is inserted in the keyslot and fixed by screws, so as to maintain a preload between the two nuts for enabling a synchronous rotation of the two nuts. The aforesaid structure adjusts the preload between the two nuts by the thickness of the preload piece. In other words, the conventional technology utilizes the keyslot and the clamp pad as a connection structure between the two nuts, thus preventing the nuts from rotating relative to each other, and the thickness of the preload piece is used to adjust the preload between the two nuts.

After long time of study and research, we found that the abovementioned conventional connection structure between the double nut and the screw shaft still has some shortcomings to be improved.

First, the thickness of the preload piece is difficult to control. The preload of the ball screw has to do with the thickness of the preload piece. To control the preload value, it must adjust the thickness of the preload piece repeatedly. The repeating grinding work is very troublesome, and if the preload piece is not replaced periodically, the preload will go off.

Second, the flimsy preload piece will be fixed between the two nuts by cooperating with the clamp pad, the rigidity of the preload piece can produce a preload for pushing the two nuts outward. However, this rigidity of this conventional preload is too great, it will be unable to absorb sudden increase in preload, on the contrary, it will cause deformation of the element.

To solve the abovementioned problems, a conventional preload structure of a ball screw is as shown in FIG. 1 (U.S. Pat. No. 5,501,118), wherein two nuts 10 are synchronously screwed on the same screw shaft 11. To produce a preload between the two nuts 10 and to enable the two nuts 10 to rotate synchronously, a preload leaf spring 12 is arranged between the two nuts 10, and a clamp plate 13 is screwed on the nuts for connecting the preload leaf spring 12 and the two nuts 10 together. The conventional preload leaf spring 12 automatically adjusts the preload and absorbs the deformation force between the two nuts, and it has the following problems:

First, the elasticity and the thickness of preload leaf spring 12 are difficult to control, to control the preload value and to solve the abrasion of the preload leaf spring 12, the preload leaf spring 12 must be replaced periodically or grinded constantly.

Second, the flimsy leaf spring 12 generates a preload for pushing the two nuts 10 outward, however, if the rigidity of the preload leaf spring is not great enough, or if the sudden increase of the preload is too large, the screw shaft 11 and the two nuts 10 will likely be damaged.

In view of the aforesaid reasons, another improved preload structure for a ball screw appears on the market, as shown in FIG. 2 (U.S. Pat. No. 5,467,661), wherein two nuts 14 are synchronously screwed on the same screw shaft 15, two opposite preload lead springs 16 are disposed between the two nuts 14, and an annular positioning assembly 17 is disposed on the outer periphery of the two nuts 14. These two opposite preload leaf springs automatically adjust the preload and absorb the deformation force between the two nuts, however they still have the following problems:

First, the elasticity and the thickness of the two preload leaf springs 16 are difficult to control, and also to control the preload value and to solve the abrasion of the preload leaf springs 16, the preload leaf springs 16 must be replaced periodically or grinded constantly.

Second, on the outer periphery of the two nuts 14 is arranged the annular positioning assembly 17, and the annular positioning assembly 17 has too many components and is complicated in structure, this will cause a substantial increase in assembly and maintenance cost.

The present invention has arisen to mitigate and/or obviate the afore-described disadvantages.

SUMMARY OF THE INVENTION

The primary objective of the present invention is to provide a fixed torque preload piece that can produce preload and can absorb suddenly increased pressure.

The preload piece of the present invention is installed between two nuts of a ball screw, the preload piece and the two nuts can be radially positioned by inserting clamp plates in keyslots. The preload piece utilizes adjusting members, elastic members and adjusting screws to make the steel balls perform pushing action, and the steel balls in the through holes will be pushed against the two nuts by the arc-shaped abutting surface of the adjusting member, the pushing of the steel balls can produce an adjustable preload, can absorb the sudden increase of the pressure effectively.

The secondary objective of the present invention is to provide a fixed torque preload piece that can reduce its own rigidity while maintain strong support and preventing deformation.

The preload piece and the two nuts is radially positioned by inserting clamp plates in keyslots, the pushing force of the steel balls produced by the cooperation between the adjusting members and the elastic members will reduce the rigidity of the preload (improving the flexibility). The steel balls and the elastic members can absorb the sudden increase of pressure, and the preload piece and the clamp plates provide strong enough support (prevention of overly deformation). Therefore, the present invention can reduce the rigidity of the preload piece while preventing deformation of the structure and preventing overly abrasion of the nuts and the screw shaft.

The third objective of the present invention is to provide a fixed torque preload piece that can adjust the preload as desired.

An adjusting member, an elastic member and an adjusting screw are installed in each of the threaded holes sequentially, the steel balls in the through holes are pushed against the two nuts by the arc-shaped abutting surface of the adjusting member, the rise and fall of the adjusting members can change the abutting force of the steel balls, thus obtaining a function of easily adjusting the preload at any time.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
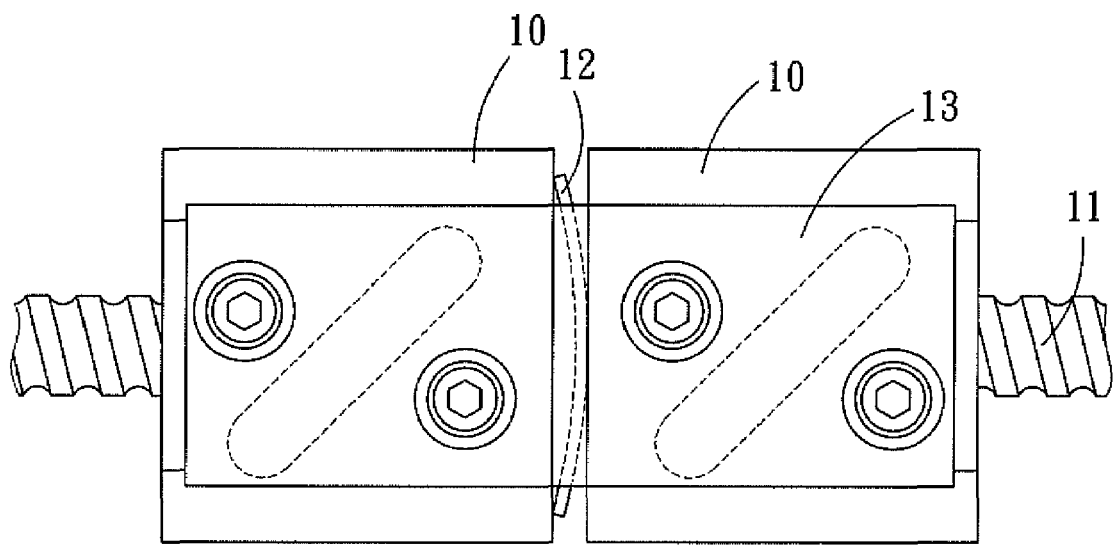
FIG. 1 is an illustrative view of a conventional preload structure.
Figure 2:
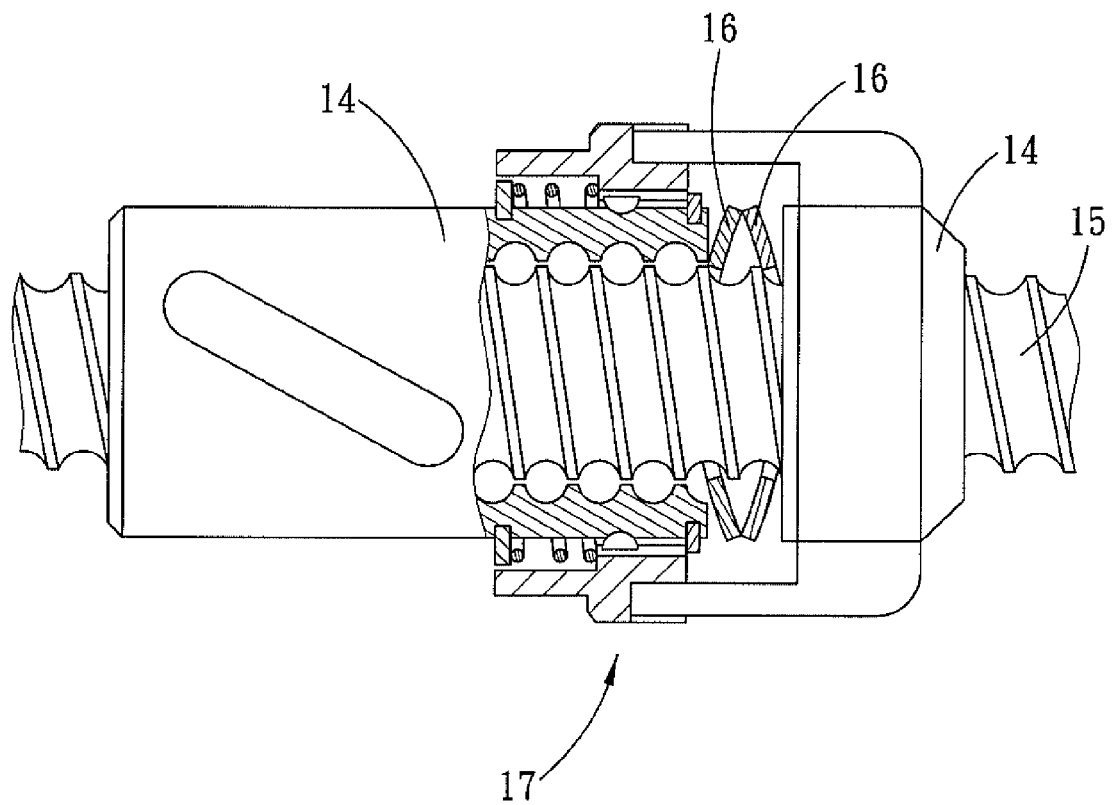
FIG. 2 is an illustrative view of another conventional preload structure.
Figure 3:
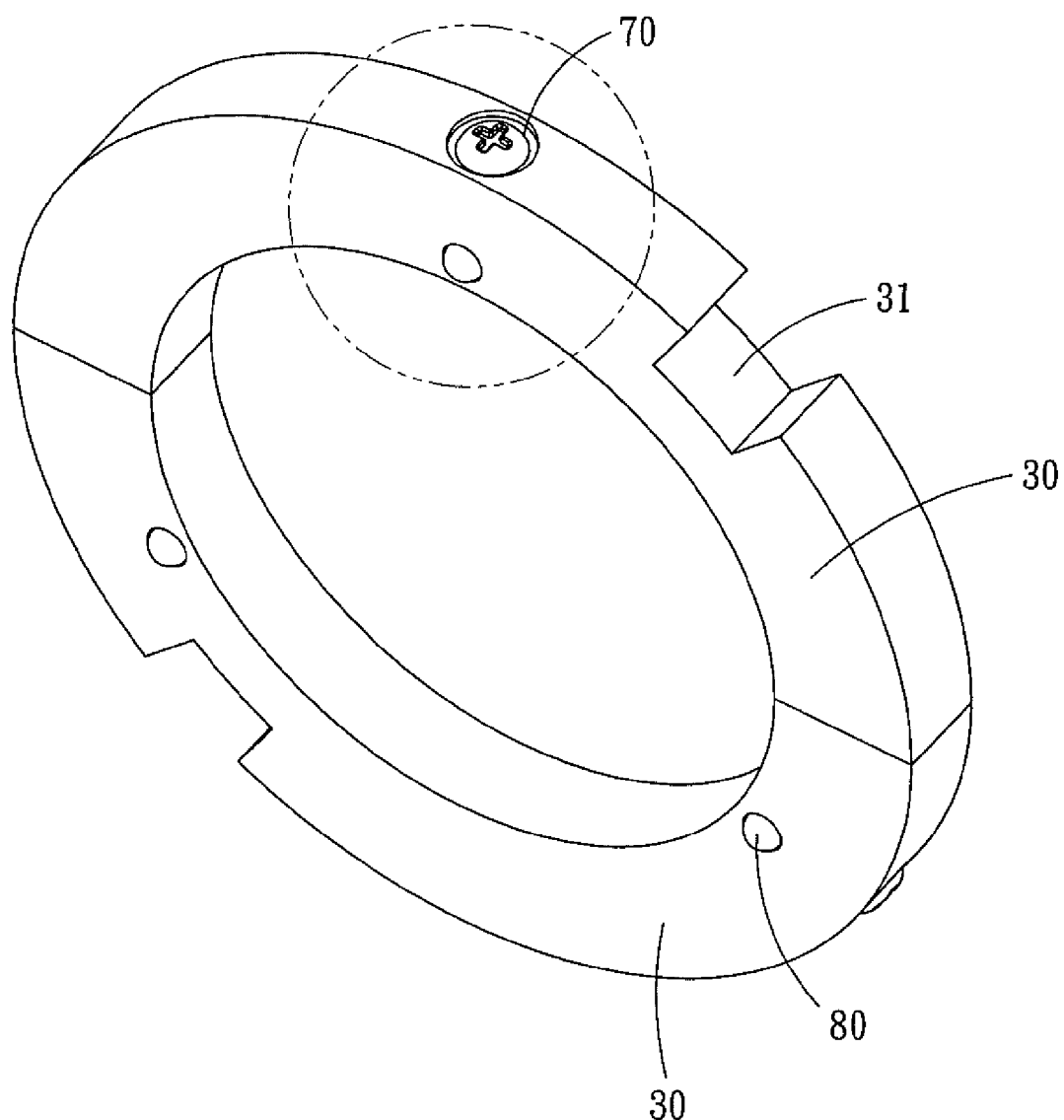
FIG. 3 is a perspective view of a preload piece in accordance with a first embodiment of the present invention.
Figure 4:
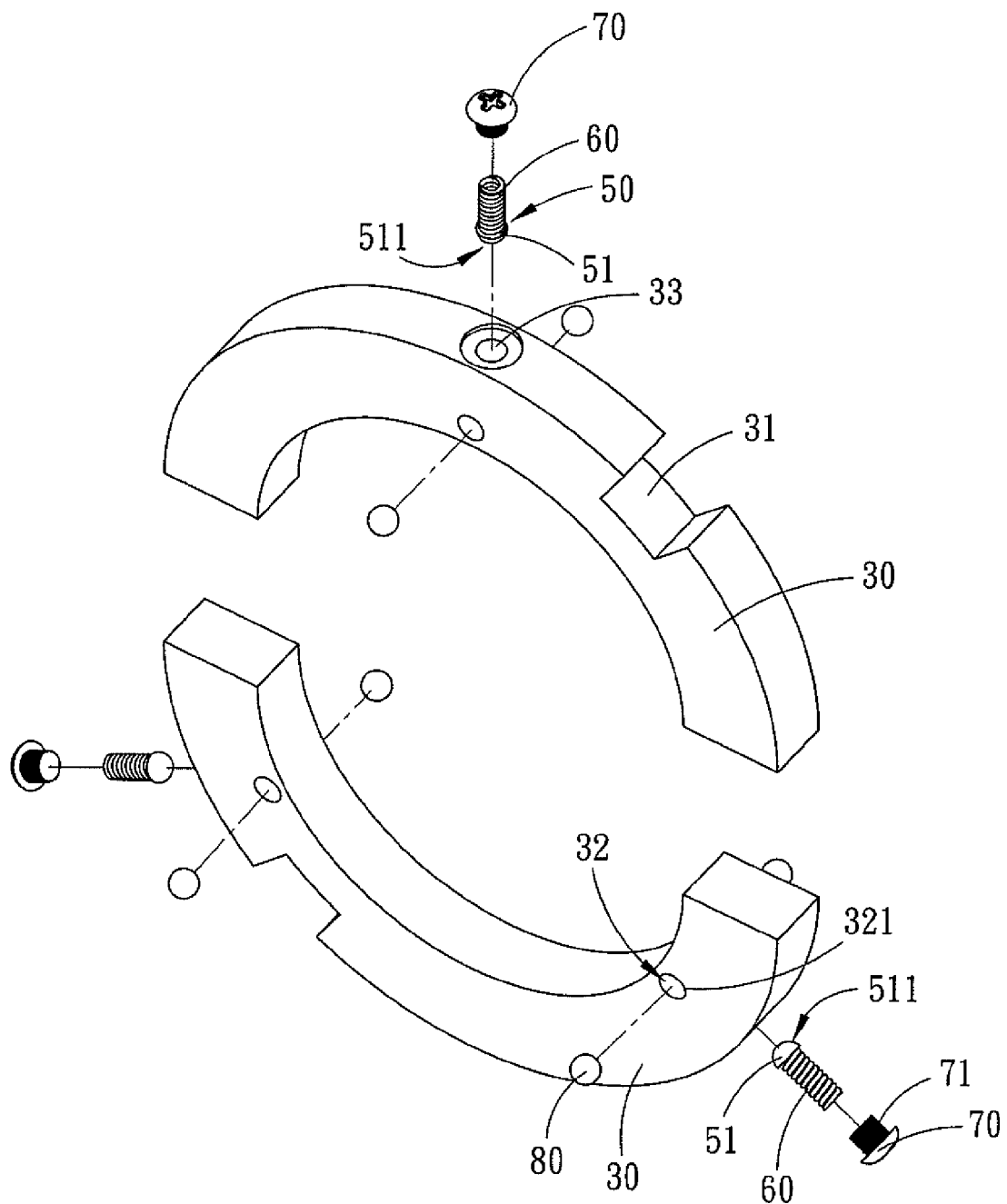
FIG. 4 is an exploded view of the preload piece in accordance with the first embodiment of the present invention.
Figure 5:
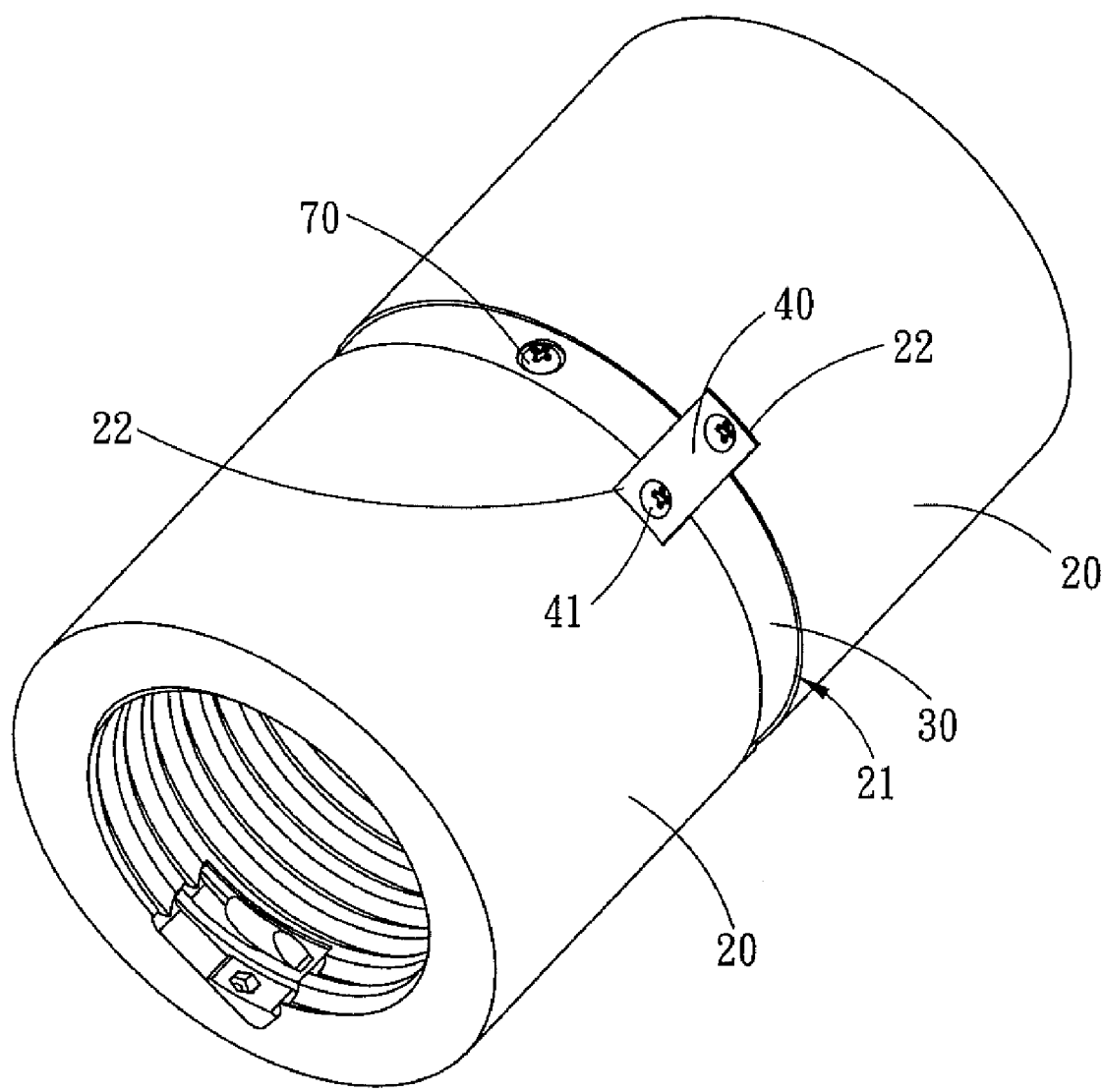
FIG. 5 is an assembly view of the preload piece in accordance with the first embodiment of the present invention.
Figure 6:
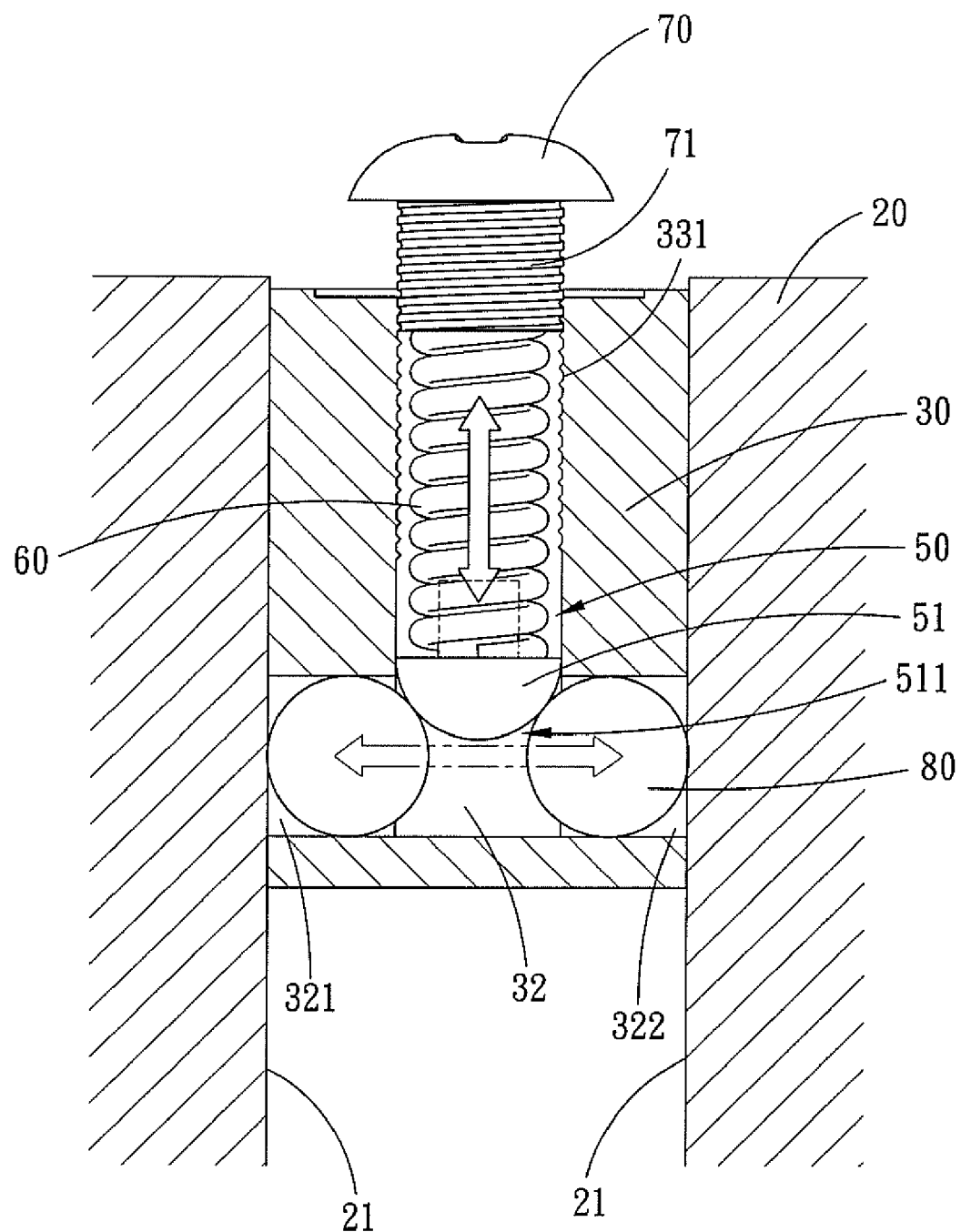
FIG. 6 is a cross sectional view of a part of the structure of the present invention.
Figure 7:
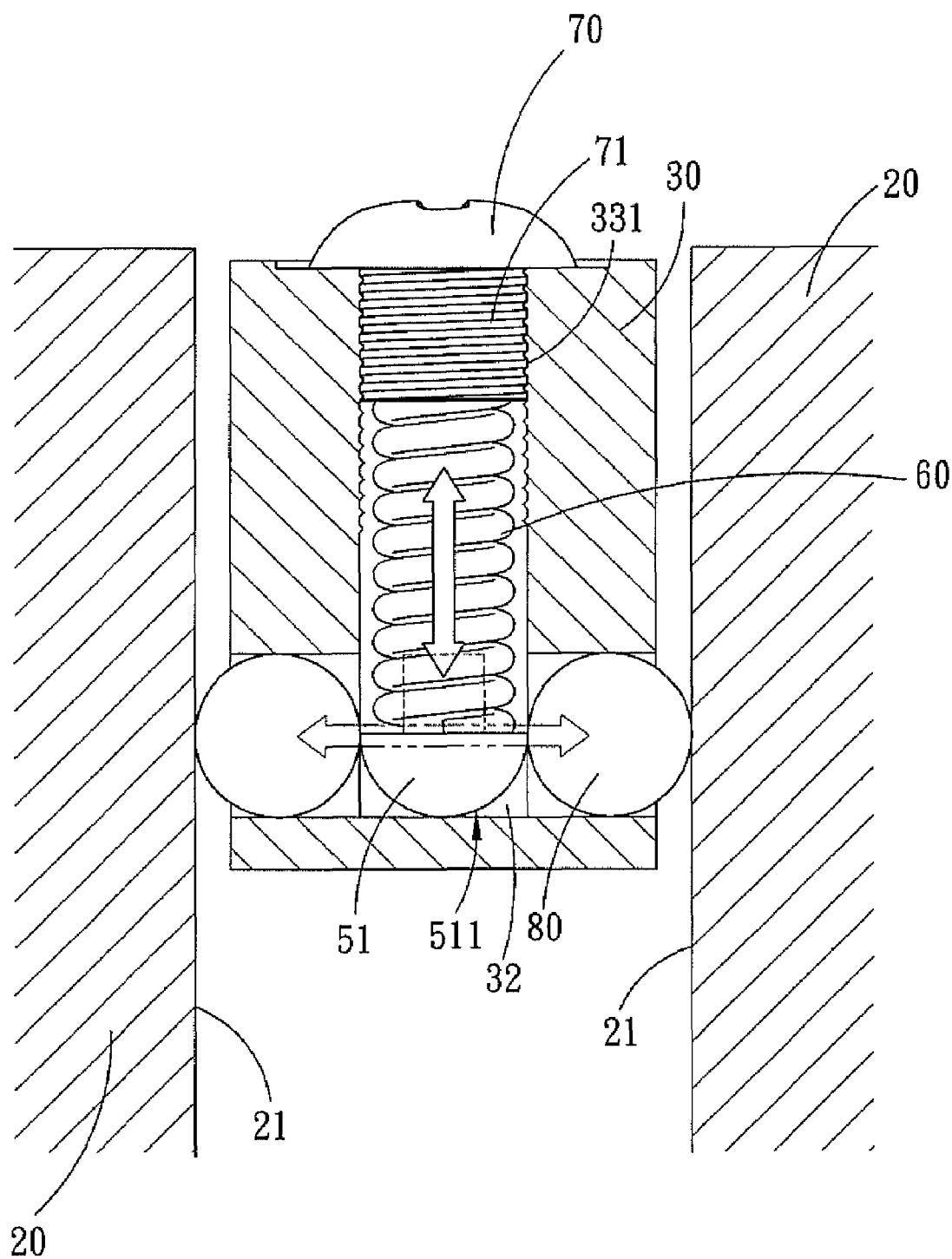
FIG. 7 is another cross sectional view of a part of the structure of the present invention.

The foregoing, and additional objects, features and advantages of the present invention will become apparent from the following detailed description of preferred embodiments thereof, taken in conjunction with the accompanying FIGS. 3-7.

The structure of a first embodiment of the present invention comprises two nuts 20, preload piece 30, two clamp plates 40, three adjusting members 50, three elastic members 60, three adjusting screws 70 and six steel balls 80 that are arranged outside a ball screw (not shown), and its structure is explained as follows:

The two nuts 20 are oppositely screwed on the screw shaft with their opposite surfaces 21 facing each other, and a plurality keyslots 22 are formed at corresponding positions in a periphery of each of the opposite surfaces 21 of two nuts 20.

The preload piece 30 is installed between the two nuts 20, and the preload piece 30 is an annular structure formed by two semicircular pieces. A plurality of keyslots 31 are formed in the preload piece 30 and located correspondingly to the keyslots 22 of the nuts 20. The preload piece 30 is formed with three through holes 32 located in the axial direction of the two nuts 20 (the three through holes 32 are equidistantly arranged with respect to the axis of the preload piece 30), and two terminal openings 321 and 322 of each of the through holes 32 are defined in the surfaces of the preload piece 30 facing the two opposite nuts 20. Three radial threaded holes 33 are formed in the outer periphery of the preload piece 30, the inner periphery of the respective radial threaded holes 33 is formed with inner threads 331, and the threaded holes 33 are vertical to and in communication with the through holes 32.

Each of the clamp plates 40 is synchronously inserted in the keyslots 22 and 31 of the nuts 20 and the preload piece 30, and is fixed by screwing screws 41 in the keyslots 22 of the nuts 20, thus obtaining the radial position of the preload piece 30. And clearance is left between the nuts 20 and the preload 30.

The adjusting members 50 each has a semispherical portion 51 with an arc-shaped abutting surface 511 formed at an end thereof. The adjusting members 50 are moveably inserted in the threaded holes 33 of the preload piece 30 with the arc-shaped abutting surface 511 facing the through holes 32 of the preload piece 30.

The elastic members 60 are received in the threaded holes 33 of the preload piece 30 in such a manner that one end of each of the elastic members 60 is fixed at another end of the adjusting members 50 opposite the arc-shaped abutting surface 511 (it can be fixed by soldering method or can be pushed onto the adjusting member 50 directly).

The adjusting screws 70 each has outer threads 71 screwed with the inner threads 331 of the threaded holes 33 in the outer periphery of the preload piece 30, and each of the adjusting screws 70 abuts against another end of the respective elastic members 60.

At least two steel balls 80 are received in each of the through holes 32 of the preload piece 30 and located at both sides of the respective through holes 32 in such a manner that an end of the respective steel balls 80 abuts against the arc-shaped abutting surface 511 of semispherical portion 51 of the adjusting member 50, and another end of each of the steel balls 80 abuts against the opposite surfaces 21 of the two nuts 20 (be exposed in the clearance between the nuts 20 and the preload piece 30).

With the abovementioned structures and the delicate arrangement of their interrelationships, and by cooperating with the below mentioned mutual working theory of the respective structures, the aforementioned objectives of the present invention can be achieved.

In use, the steel balls 80 at both sides of each of the through holes 32 of the preload 30 will protrude in the clearance (exposed to the clearance left between the nuts 20 and the preload piece 30) in such a manner that an end of the respective steel balls 80 abuts against the arc-shaped abutting surface 511 of semispherical portion 51 of the adjusting member 50, and another end of each of the steel balls 80 abuts against the opposite surfaces 21 of the two nuts 20. Therefore, a sudden increase of pressure between the nuts 20 and the preload piece 30 will be counteracted by the displacement of the steel balls 80 at different positions (the steel balls 80 press against the semispherical portion 51 of the adjusting member 50, so that the suddenly increase pressure is absorbed by the elastic members 60). In addition to this, it also can prevent overly abrasion caused by the sudden increase in pressure. Therefore, the sudden increase of pressure can be absorbed completely. Furthermore, the individual motion of the steel balls 80 at different positions produces flexible retractions without referring each other, making the present invention more flexible to absorb the sudden increase of the pressure.

The preload of the present invention will be transmitted to the steel balls 80 via the elastic members 60 after the adjusting screws 70 press against the elastic members 60, so as to make the steel balls 80 at both sides of the through holes 32 of the preload piece 30 protrude outward, and make the opposite surfaces 21 of the two nuts 20 produce a preload on the steel balls. Therefore, the present invention truly can provide stable preload.

It is to be noted that the outer threads 71 of the adjusting screw 70 are screwed with the inner threads 331 of the threaded holes 33 in the outer periphery of the preload piece 30, and the adjusting screw 70 is very convenient for the user to rotate and adjust. The adjusting screws 70 can be rotated to move up and down within the threaded holes 33, meanwhile, the elastic member 60 will also move up and down (or expands or retracts), and this will result in a change of the preload making the steel balls 80 protrude outward will be changed. Therefore, the present invention can produce preload very easily by adjusting the preload piece 30, effectively solving the problems of the conventional structure.

Finally, the operation data of the present invention can be proved by Hook's law, $F=K \times \Delta X$ (1) when k of the preload piece A=100:
$F_A = 100 \times \Delta X$
(2) when k of the preload piece B=1:
$F_B = 1 \times \Delta X$
F represents external force
K represents rigidity
$\Delta X$ is error, which can be pitch error or surface roughness or unevenness It is proved by the above equation that the greater the value of K (rigidity) or $\Delta X$ (error), the greater the external force acted on the structure. Hence, the method of using the moveable steel balls 80 to decrease the rigidity can reduce the influence on the preload piece when it is subjected to external force.

Figure 8:
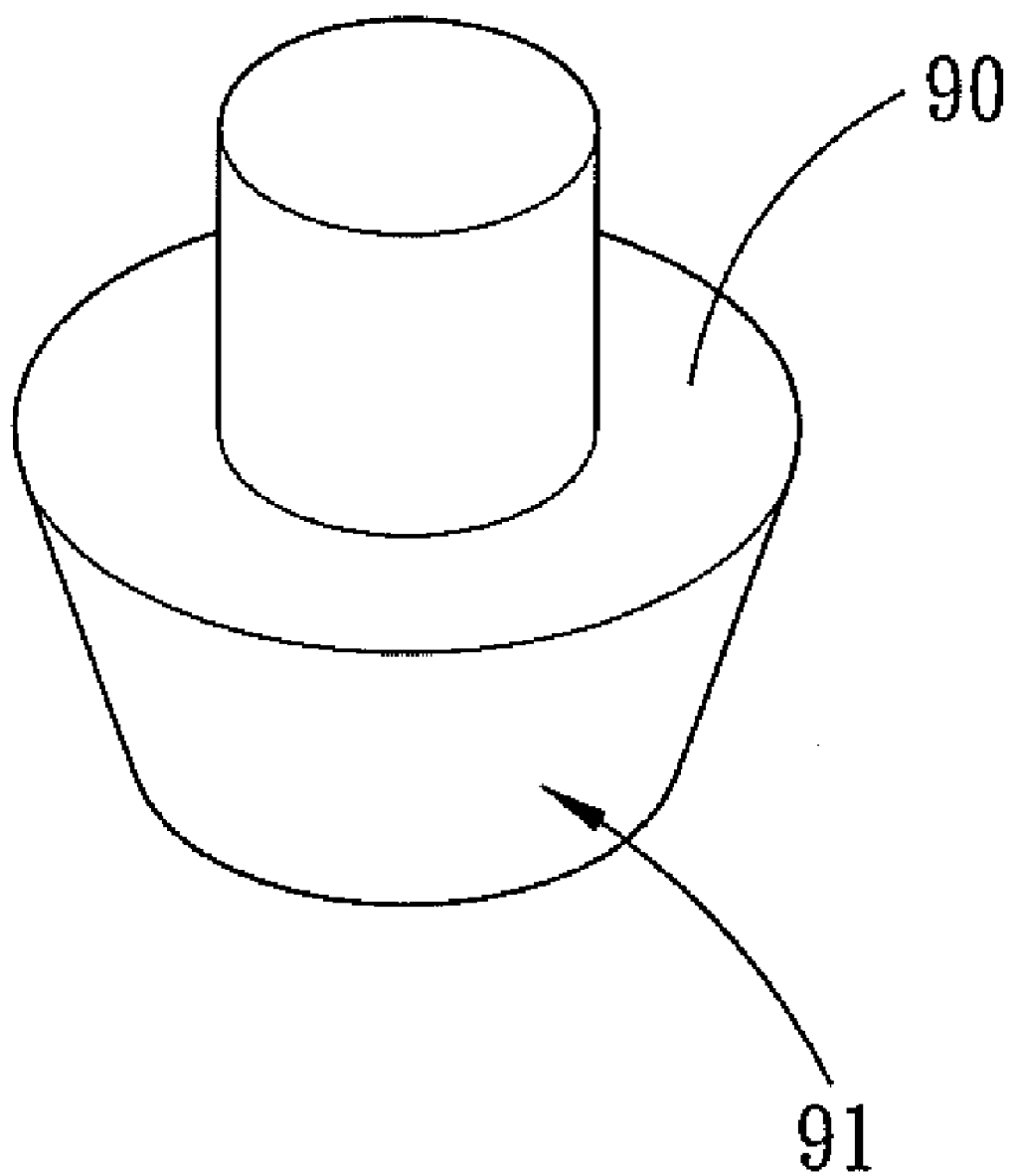
FIG. 8 shows an adjusting member in accordance with another embodiment of the present invention.
Figure 9:
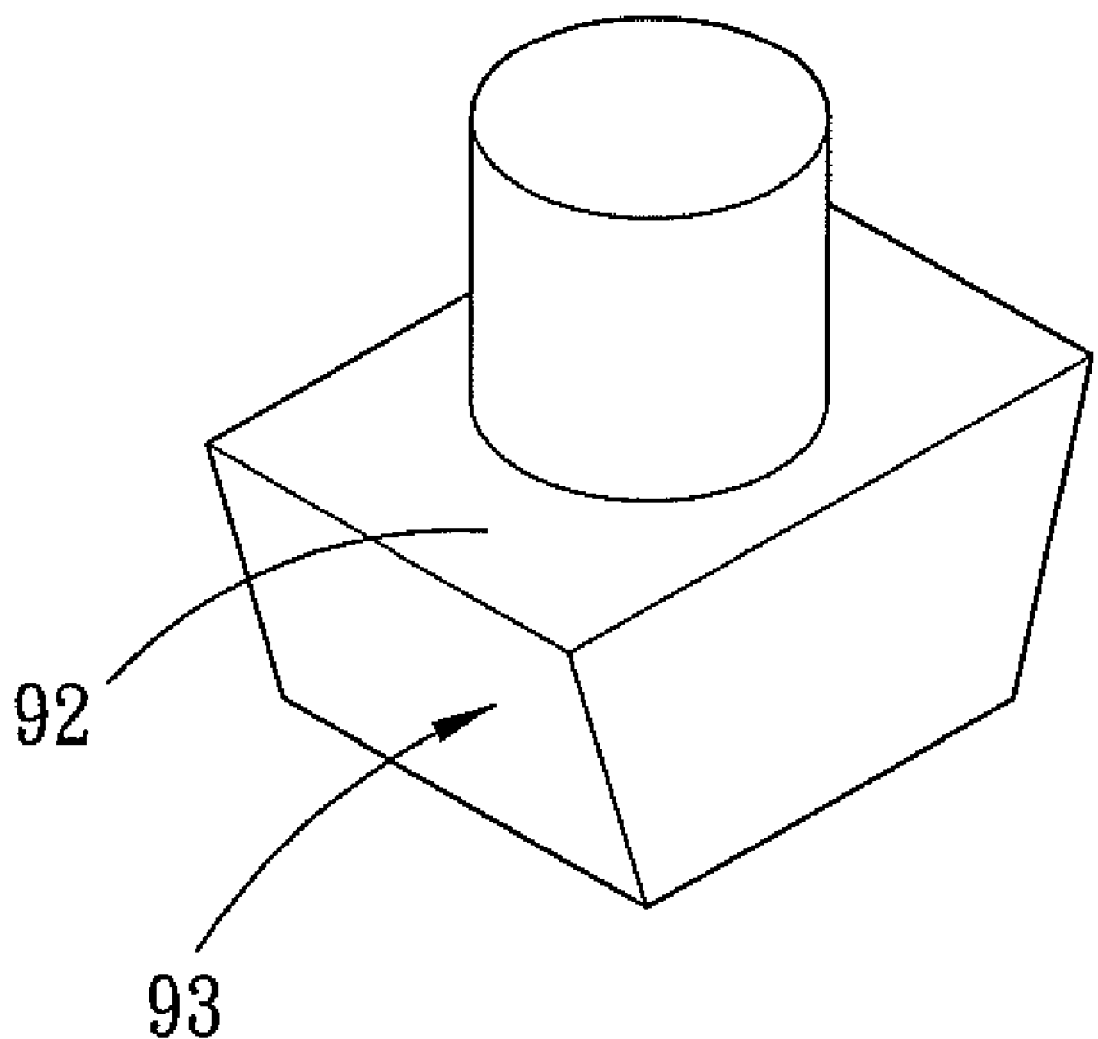
FIG. 9 shows an adjusting member in accordance with another embodiment of the present invention.

Referring to FIGS. 8 and 9, an end of the adjusting member 50 also takes the form of a truncated conical portion 90 having an arc-shaped abutting surface 91. Or it can be a rectangular portion 92 having slant abutting surfaces 93. All the various configurations of the aforesaid adjusting member 50 have a function of easily adjusting and generating a preload at any time.

To summarize, the innovated design of the present invention lies in that the preload is defined with through holes located in the axial direction of the two nuts for accommodation of at least two steel balls. Two terminal openings of each of the through holes are defined in the surfaces of the preload piece facing the two opposite nuts. Three radial threaded holes are formed in the outer periphery of the preload piece, and the threaded holes are vertical to and in communication with the through holes. An adjusting member, an elastic member and an adjusting screw are received sequentially in each of the threaded holes. The steel balls in the through holes are pushed against the two nuts by the arc-shaped abutting surface of the adjusting member, the pushing of the steel balls can produce an adjustable preload, and can absorb the sudden increase of the pressure effectively, thus obtaining the objective of the present invention of outputting torque stably.

While we have shown and described various embodiments in accordance with the present invention, it should be clear to those skilled in the art that further embodiments may be made without departing from the scope of the present invention.

What is claimed is:

1. A fixed torque preload piece radially positioned between two nuts of a ball screw, and a clearance left between the nuts and the preload piece, the fixed torque preload piece being characterized in that:

the preload piece is annular-shaped and is formed with at least three through holes located in an axial direction of the two nuts, at least three threaded holes are formed in an outer periphery of the preload piece and arranged in a radial direction thereof, and the threaded holes are vertical to and in communication with the through holes;

at least three adjusting members each has an abutting surface formed at an end thereof, each of the adjusting members is moveably inserted in the respective threaded holes such that the abutting surface faces the through holes of the preload piece;

at least three elastic members, each of which is received in each of the threaded holes such that an end of each of the elastic members is connected to each of the adjusting members;

at least three adjusting screws, each of which is screwed in each of the threaded holes and serve to abut against the elastic members; and at least two steel balls are received in each of the through holes, at least one steel ball is disposed at either side of the respective through holes such that the steels ball protrude into a clearance between the nuts and the preload piece, one end of the respective steel balls abuts against the abutting surface of the adjusting members and another end of the respective steel balls abuts against the nuts.

2. The fixed torque preload piece as claimed in claim 1, wherein the preload piece is a structure comprised of more than two arc-shaped pieces.

3. The fixed torque preload piece as claimed in claim 2, wherein a plurality keyslots are formed in a periphery of an opposite surface of each of the two nuts, a plurality of keyslots are formed in the preload piece and located correspondingly to the keyslots of the nuts, a plurality of clamp plates are synchronously inserted in the keyslots of the nuts and the preload piece, and the respective clamp plate are fixed by screws that are screwed in the keyslots of the nuts, thus obtaining radial position of the preload piece.

4. The fixed torque preload piece as claimed in claim 3, wherein each of the adjusting members is formed at end thereof with a semispherical portion having an arc-shaped abutting surface, and the steel balls in each of the through holes abut against both sides of the semispherical portion.

5. The fixed torque preload piece as claimed in claim 2, wherein each of the adjusting members is formed at end thereof with a semispherical portion having an arc-shaped abutting surface, and the steel balls in each of the through holes abut against both sides of the semispherical portion.

6. The fixed torque preload piece as claimed in claim 1, wherein the elastic members are connected to the adjusting members by soldering method or are pushed onto the adjusting members directly.

7. The fixed torque preload piece as claimed in claim 6, wherein each of the adjusting members is formed at end thereof with a semispherical portion having an arc-shaped abutting surface, and the steel balls in each of the through holes abut against both sides of the semispherical portion.

8. The fixed torque preload piece as claimed in claim 1, wherein each of the adjusting members is formed at end thereof with a semispherical portion having an arc-shaped abutting surface, and the steel balls in each of the through holes abut against both sides of the semispherical portion.

* * * * *